US011970571B2

(12) United States Patent
O'Brien et al.

(10) Patent No.: US 11,970,571 B2
(45) Date of Patent: *Apr. 30, 2024

(54) POLYOL-EPOXIDE POLYMERS FOR NVH DAMPING APPLICATIONS

(71) Applicant: STEPAN COMPANY, Northfield, IL (US)

(72) Inventors: Michael E. O'Brien, Hainesville, IL (US); Warren A. Kaplan, Libertyville, IL (US); Sarah Wolek, Arlington Heights, IL (US); Jennifer S. Westfall, McDonald, PA (US); Calvin Gang, Chicago, IL (US)

(73) Assignee: STEPAN COMPANY, Northfield, IL (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/510,637

(22) Filed: Oct. 26, 2021

(65) Prior Publication Data

US 2022/0041798 A1 Feb. 10, 2022

Related U.S. Application Data

(63) Continuation of application No. PCT/US2020/029822, filed on Apr. 24, 2020.
(Continued)

(51) Int. Cl.
*C08G 59/06* (2006.01)
*C08G 59/24* (2006.01)
(Continued)

(52) U.S. Cl.
CPC ......... *C08G 59/063* (2013.01); *C08G 59/245* (2013.01); *C08G 59/686* (2013.01);
(Continued)

(58) Field of Classification Search
None
See application file for complete search history.

(56) References Cited

U.S. PATENT DOCUMENTS

| 5,237,018 A | 8/1993 | Sorathia et al. |
| 5,494,981 A | 2/1996 | Gorodisher et al. |

(Continued)

FOREIGN PATENT DOCUMENTS

| EP | 0472185 A2 | 2/1992 |
| WO | 2018038908 A1 | 3/2018 |

(Continued)

OTHER PUBLICATIONS

International Search Report issued in International Application No. PCT/US2020/029822, dated Jul. 20, 2020.

*Primary Examiner* — Randy P Gulakowski
*Assistant Examiner* — Ha S Nguyen
(74) *Attorney, Agent, or Firm* — DILWORTH IP, LLC

(57) ABSTRACT

Noise, vibration, or harshness (NVH) properties of an industrial or consumer product are reduced by incorporating therein an effective amount of a polyether- or polyester-epoxide polymer (PEEP) composition. The PEEP compositions are one-component or two-component reaction products of a polyepoxide compound and a polyol composition. The PEEP compositions have a glass-transition temperature within the range of −50° C. to 50° C. and a loss factor of at least 0.5 by ASTM D5992 over a temperature range of at least 15 Celsius degrees at one or more frequencies within the range of 0.1 to 10,000 Hz. The PEEP compositions provide NVH damping over a broad temperature range, have improved flexibility compared with conventional epoxy technologies, avoid amine and isocyanate reactants, and can be tailored to meet target specifications.

25 Claims, 10 Drawing Sheets

Related U.S. Application Data

(60) Provisional application No. 62/839,190, filed on Apr. 26, 2019.

(51) Int. Cl.
    *C08G 59/42*     (2006.01)
    *C08G 59/62*     (2006.01)
    *C08G 59/68*     (2006.01)
    *C08G 59/72*     (2006.01)
    *C08G 65/331*     (2006.01)
    *C08L 67/02*     (2006.01)
    *C08L 71/08*     (2006.01)
    *G10K 11/162*     (2006.01)

(52) U.S. Cl.
    CPC .............. *C08G 59/72* (2013.01); *C08L 67/02* (2013.01); *C08L 71/08* (2013.01); *C08G 2170/00* (2013.01); *C08G 2350/00* (2013.01)

(56) References Cited

U.S. PATENT DOCUMENTS

| | | | |
|---|---|---|---|
| 6,153,709 A | 11/2000 | Xiao et al. | |
| 2003/0165688 A1 | 9/2003 | Desai et al. | |
| 2016/0152819 A1* | 6/2016 | Balijepalli | ............... C08J 3/247 |
| | | | 523/400 |
| 2017/0096522 A1* | 4/2017 | Kobatake | ............... C08K 5/527 |

FOREIGN PATENT DOCUMENTS

| | | | | |
|---|---|---|---|---|
| WO | WO-2018038908 A1 * | 3/2018 | ........... | C08G 59/063 |
| WO | 2018182770 A1 | 10/2018 | | |

* cited by examiner

POLYOL-EPOXIDE POLYMERS FOR NVH DAMPING APPLICATIONS

FIELD OF THE INVENTION

The invention relates to polyol-epoxide polymer compositions and their use in noise, vibration, and harshness damping applications.

BACKGROUND OF THE INVENTION

Recently, we described polyester- and polyether-epoxide polymer compositions ("PEEP" compositions) comprising reaction products of a polyepoxide compound and a polyester polyol or polyether polyol composition (see PCT Internat. Publ. Nos. WO 2018/038908 and WO 2018/182770). The products are versatile alternatives to amine-cured epoxies and isocyanate-based polyurethanes, and they are useful for coatings, adhesives, sealants, elastomers and other valuable products. Generally, PEEP compositions retain benefits of conventional epoxy compositions, but they have increased elongation, enhanced flexibility, and improved tunability. PEEP products can be formulated as one-component (1K) or two-component (2K) systems and can be cured at room or elevated temperature using a variety of catalysts, especially Lewis acids.

In many consumer and industrial applications, products are designed with materials that help to reduce noise, vibration, or harshness ("NVH") properties when the products are used as intended. In some cases, the NVH reduction is necessary to comply with OSHA, EPA, or other government regulations. Such materials are in high demand in the transportation, construction, appliance, electronics, and other industries. Examples include such diverse applications as motor vehicles, boats, aircraft, dishwashers, washing machines, refrigerators, lawn mowers, leaf blowers, snow blowers, mixers, vacuum cleaners, computers, sporting goods, and HVAC equipment. Sealants, adhesives, and elastomers that can help to reduce NVH properties are especially needed.

The usefulness of materials for NVH applications depends in part on "loss factor" (or "tan delta"), which is a measure of damping that can be evaluated by a standard resonance test method for a given set of temperature and frequency conditions. A preferred material should have a loss factor of at least 0.5 over at least a 15 Celsius degree temperature range that coincides with the temperatures at which the product is meant to operate or be used. Ideally, a desirable loss factor is also achievable over a wide range of frequencies, particularly frequencies within the range of 0.1 Hz to 10,000 Hz, and especially 0.1 to 10 Hz.

Today, most NVH materials are based on polyurethanes, flexible epoxies, modified acrylics, or lightweight composite materials, many of which require polyisocyanates, amine curatives, or polymers that emit an undesirable or intolerable amount of off-gasses. Many of these materials are not easily customized to achieve desired performance attributes. In some cases, multiple curing processes are involved to form an interpenetrating network (IPN), as is described, for example, in U.S. Pat. Nos. 5,237,018; 5,494,981, and 6,153,709.

The industry would benefit from the availability of new materials for NVH applications. Desirable materials are characterized by a loss factor of at least 0.5 by ASTM D5992 over a temperature range of at least 15 Celsius degrees at one or more frequencies within the range of 0.1 to 10,000 Hz. Ideally, the compositions would provide NVH damping over a broad temperature range, would have improved flexibility compared with conventional epoxy technologies, would avoid amine and isocyanate reactants, and could be tailored to meet target specifications.

SUMMARY OF THE INVENTION

In one aspect, the invention relates to a method which comprises reducing noise, vibration, or harshness properties of an industrial or consumer product by incorporating therein an effective amount of a polyether- or polyester-epoxide polymer (PEEP) composition. The PEEP composition comprises a one-component or two-component reaction product of a polyepoxide compound and a polyol composition. The polyepoxide compound has an equivalent weight within the range of 115 to 250 g/eq. The polyol composition comprises a polyether polyol, a polyester polyol, or a combination thereof. The polyester polyols have a hydroxyl value within the range of 28 to 400 mg KOH/g, an average hydroxyl functionality within the range of 1.5 to 4.0, and an acid number less than 5 mg KOH/g. The polyether polyols have a hydroxyl value within the range of 28 to 800 mg KOH/g and an average hydroxyl functionality within the range of 1.8 to 8.0. The ratio of epoxy equivalents of the polyepoxide compound to hydroxyl equivalents of the polyol composition in the PEEP composition is within the range of 0.5 to 4.0. The PEEP composition has a glass-transition temperature as measured by differential scanning calorimetry within the range of −50° C. to 50° C. The PEEP composition also has a loss factor of at least 0.5 by ASTM D5992 over a temperature range of at least 15 Celsius degrees at one or more frequencies within the range of 0.1 to 10,000 Hz.

We found that PEEP compositions can be formulated to achieve a desirable degree of NVH damping. Thus, adhesives, sealants, or elastomers having loss factors of at least 0.5 and an otherwise desirable balance of strength and flexibility properties can be produced by taking advantage of the inherent versatility of PEEP systems. Because a wide variety of PEEP compositions can be produced from commercially available epoxy resins and polyether and/or polyester polyols, formulators have great flexibility in designing compositions for applications that demand NVH reduction. PEEP compositions offer NVH damping over a broad temperature range, have improved flexibility compared with conventional epoxy technologies, avoid amine and isocyanate reactants, and can be tailored to meet target specifications.

DETAILED DESCRIPTION OF THE INVENTION

Figure 1:
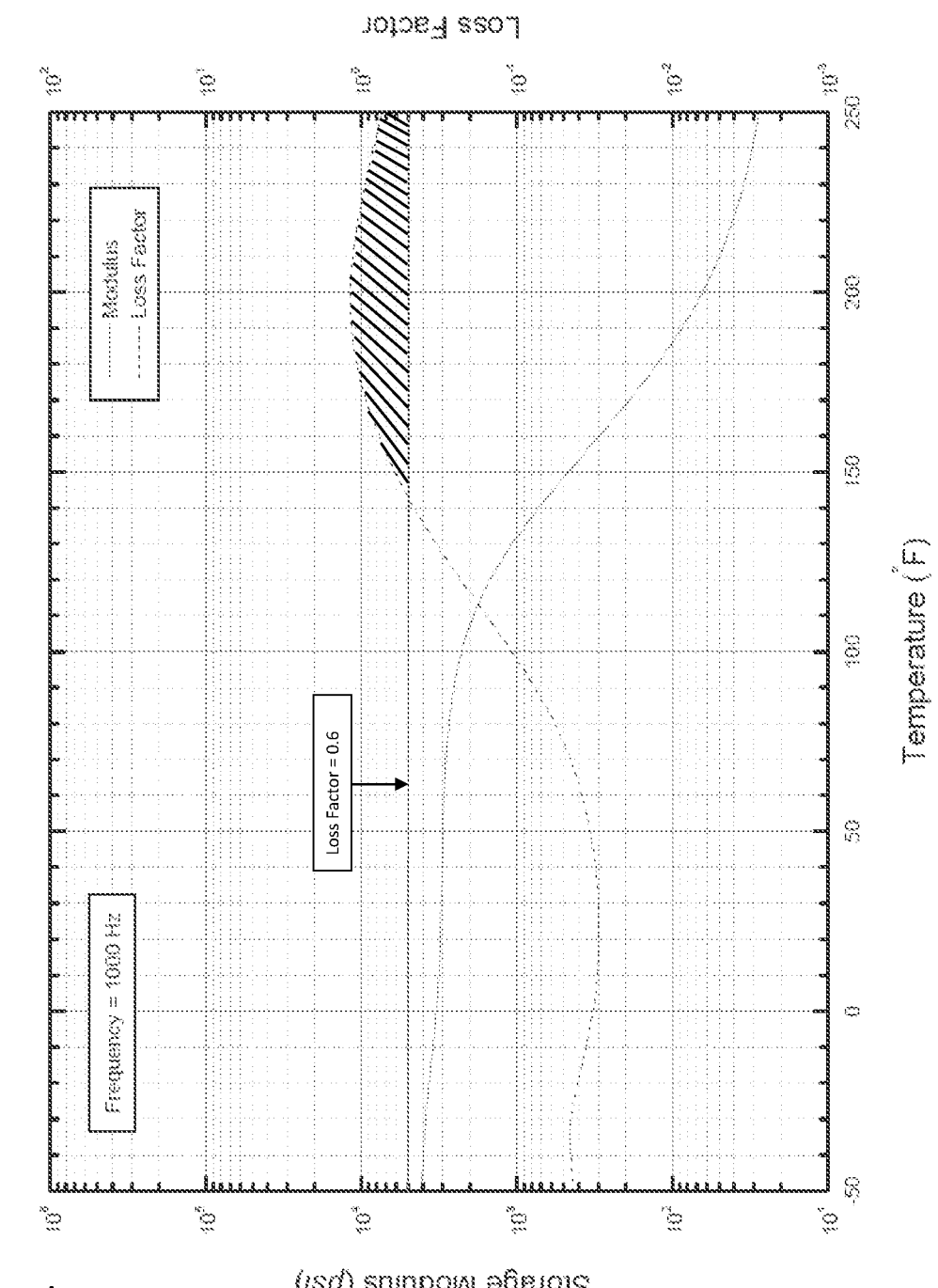
FIG. 1 is a plot from resonance testing according to ASTM D5992 of a first PEEP composition showing storage modulus (log scale) and loss factor (log scale) as a function of temperature at a constant frequency of 1000 Hz.
Figure 2:
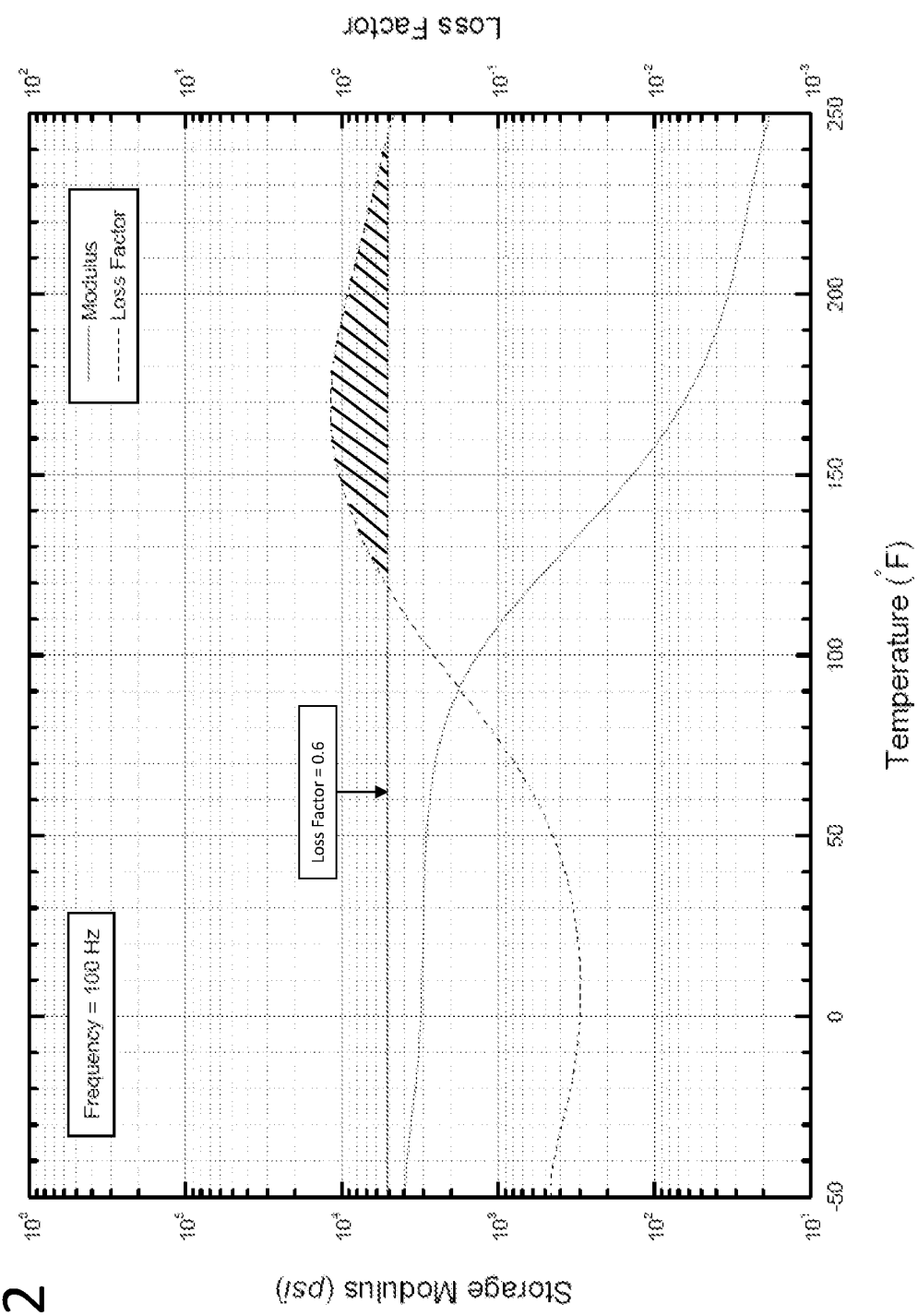
FIG. 2 is like FIG. 1 but measured at 100 Hz.
Figure 3:
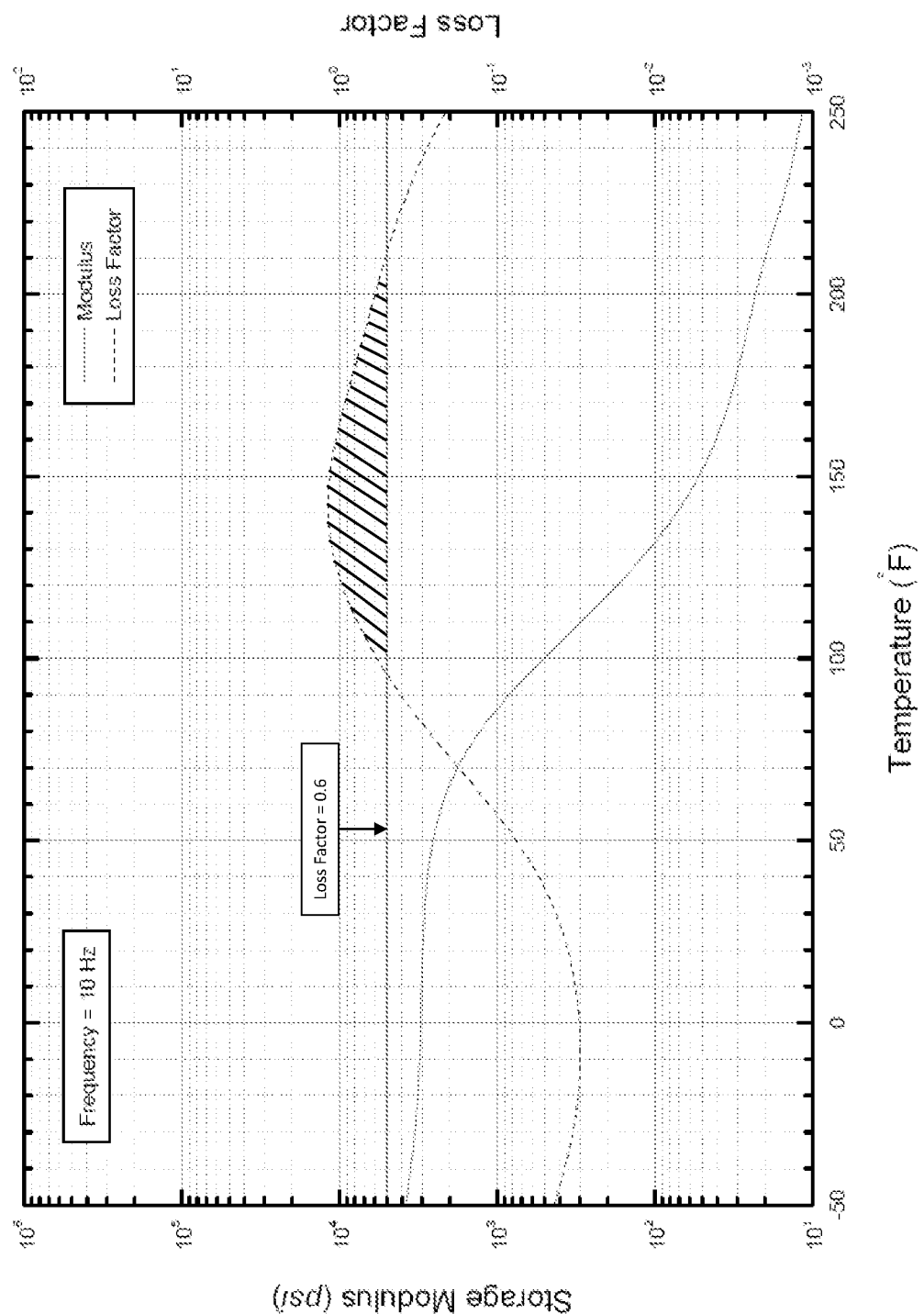
FIG. 3 is like FIG. 1 but measured at 10 Hz.

In one aspect, the invention relates to a method which comprises reducing noise, vibration, or harshness properties of an industrial or consumer product by incorporating therein an effective amount of a polyether- or polyester-epoxide polymer (PEEP) composition.

"Noise" refers to unwanted sound. "Vibration" refers to oscillations that can be seen, heard, felt, or some combination of these, but are often just felt. "Harshness" relates to the severity or discomfort we experience upon exposure to noise or vibration, especially an uncomfortable noise or vibration of short duration (e.g., the jolt a rider feels when a car hits a pothole or bump in the road).

By "effective amount," we mean the quantity, proportion, or thickness (or other relevant dimension) of PEEP composition that has a loss factor of at least 0.5 by ASTM D5992 and delivers a measurable improvement in the noise, vibration, or harshness properties of a consumer or industrial product. The amount used will depend on many factors left to the skilled person's discretion, including the design requirements of the intended product, cost considerations, weight considerations, the physical and mechanical properties of the PEEP composition, the temperature at which the consumer or industrial product operates or is used, and other factors. In some cases, a thin layer of PEEP composition (e.g., a coating) may satisfy the needs of the product. For other applications, particulates, a sheet, a solid or molded part, or a foamed article will be needed.

"Loss factor," in the context of dynamic mechanical analysis, refers to the ratio of the loss modulus to the storage modulus. "Loss factor" and "tan delta" have the same meaning and are used interchangeably in this application.

The PEEP composition comprises a one-component or two-component reaction product of a polyepoxide and a polyol composition. "One-component" or "1K" compositions are typically meant for elevated temperature curing and are supplied as a single package of reactive components. "Two-component" or "2K" systems are provided as separate components that react when combined either under ambient conditions or elevated temperature. Epoxy adhesives having an epoxy component and an amine-functional hardener are a familiar example of a 2K system.

The Polyepoxide Compound

Suitable polyepoxide compounds have two or more epoxide groups per molecule and an equivalent weight within the range of 115 to 250 g/eq., or in some aspects 125 to 240 g/eq., 150 to 235 g/eq., or 185 to 200 g/eq.

In preferred aspects, the polyepoxide compound has an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available; others are readily synthesized from the reaction of epichlorohydrin and a suitable polyol or polyamine precursor, preferably from, epichlorohydrin and an aromatic, aliphatic, or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties. Aromatic polyepoxides such as EPON® 828 resin are particularly preferred.

Suitable polyepoxide compounds include bisphenol diglycidyl ethers in which the Zo aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as those available from CVC Thermoset Specialties: resorcinol diglycidyl ether (ERISYS® RDGE), tris(hydroxyphenyl)ethane triglycidyl ether (EPALLOY® 9000), trimethylolpropane triglycidyl ether (ERISYS® GE-30), resorcinol/phenol novolac epoxy resins (e.g., ERISYS® RN-3650), other epoxy novolac resins (e.g., EPALLOY® 8280), and m-xylenediamine tetraglycidyl ether (ERISYS® GA 240). Suitable polyepoxide compounds also include aromatic, aliphatic, and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200) or glycidyl esters of aliphatic dicarboxylic acids such as diglycidyl succinate, diglycidyl maleate, or diglycidyl adipate.

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; several are commercially available from CVC Thermoset Specialties (e.g., ERISYS® GE-21 and ERISYS® EGDGE) or from other suppliers.

Mixtures of various types of polyepoxide compounds can be used. Suitable compositions can be made using aromatic polyepoxide compounds only (e.g. EPON® 828), aliphatic polyepoxide compounds only (e.g., ERISYS® GE-30), or some combination thereof.

In some aspects, a monofunctional glycidyl ether or a monofunctional glycidyl ester is included along with the polyepoxide compound as a reactive diluent. For instance, suitable monofunctional glycidyl esters include glycidyl esters of aliphatic carboxylic acids available from Hexion under the CARDURA™ mark (e.g., CARDURA™ E10P aliphatic glycidyl esters). Suitable monofunctional glycidyl ethers include glycidyl ethers of aliphatic alcohols, such as the ERISYS® products from CVC Thermoset Specialties, including ERISYS® GE-5, ERISYS® GE-6, ERISYS® GE-7, ERISYS® GE-8, and the like. Similar products are available from Dow, Evonik, and Miller-Stephenson.

The polyepoxide compound is used in an amount such that the ratio of epoxy equivalents of the polyepoxide compound to hydroxyl equivalents of the polyol composition (also described herein as the "epoxy/OH eq. ratio") is within the range of 0.5 to 4.0. In other aspects, the ratio of epoxy to hydroxyl equivalents will range from 0.6 to 3.0, from 0.8 to 2.0, or from 0.8 to 1.0. The "epoxy/OH index" or "epoxy/hydroxyl index" referred to herein is the epoxy/OH eq. ratio multiplied by 100. When the epoxy/OH index of the PEEP compositions exceeds 0.4, damping properties are generally insignificant. In some aspects, especially when the product will be used for a low-temperature application, it may be desirable to have use a relatively low epoxy/OH ratio, such as 0.8 to 1.10, or 0.9 to 1.05, or 0.9 to 1.0, or about 1.0.

The amount of polyepoxide compound used can vary and will depend on many factors, including the nature of the polyepoxide compound, the nature of the polyol composition, the desired stoichiometry, and other factors. In general, however, the amount of polyepoxide compound will be within the range of 20 to 80 wt. %, 30 to 70 wt. %, or 35 to 65 wt. %, based on the amount of PEEP composition.

The Polyol Composition

The PEEP composition comprises a reaction product of the polyepoxide compound and a polyol composition. The polyol composition comprises a polyether polyol, a polyester polyol, or a combination thereof. Suitable polyester polyols have a hydroxyl value within the range of 28 to 400 mg KOH/g, an average hydroxyl functionality within the range of 1.5 to 4.0, and an acid number less than 5 mg KOH/g. Suitable polyether polyols have a hydroxyl value within the range of 28 to 800 mg KOH/g and an average hydroxyl functionality within the range of 1.8 to 8.0. The amount of polyol composition used can vary and will depend on many factors, including the nature and amount of the polyepoxide compound, the nature of the polyol composition, the desired stoichiometry, and other factors. In general, however, the amount of polyol composition will be within the range of 20 to 80 wt. %, 30 to 70 wt. %, or 35 to 65 wt. %, based on the amount of PEEP composition. As indicated above, the amount of polyol composition used will be an amount effective to give an epoxy/OH eq. ratio within the range of 0.5 to 4.0. In other aspects, the ratio of epoxy to hydroxyl equivalents will range from 0.6 to 3.0, from 0.8 to 2.0, or from 0.8 to 1.0.

Polyester Polyols

Suitable polyester polyols are well known and include aromatic and aliphatic polyester polyols. These polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, phthalic acid, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, alkoxylates thereof, and combinations thereof. Other polyalcohols or alkoxylated polyalcohols suitable for use in making polyester polyols, especially polyester polyols with high hydroxyl functionality, are available commercially. Examples include Polyol 3610, Polyol 4640, Polyol 4800, Polyol R3530, and similar materials from Perstorp.

Many suitable polyester polyols for use herein are commercially available from Stepan Company and other polyol suppliers. Examples include the STEPANPOL® PS-, PC-, PD-, PH-, PHN-, PN-, and AA-series polyols, products of Stepan. Particular examples include STEPANPOL® PS 1752, STEPANPOL® PS 2002, STEPANPOL® PS 2352, STEPANPOL® PS-2402L, STEPANPOL® PS 2602, STEPANPOL® PS-3021, STEPANPOL® PS-3524, STEPANPOL® PC-1028P-210, STEPANPOL® PC-1028-115, and STEPANPOL® PC-5080-285 (aromatic polyester polyols), STEPANPOL® PDP-70 (hybrid aromatic polyester polyol), and STEPANPOL® AA-58, STEPANPOL® PC-102-110, STEPANPOL® PC-105P-110, STEPANPOL® PC-107-210, STEPANPOL® PC-1011P-210, STEPANPOL® PC-1040-55, and STEPANPOL® PC-2011-45 (aliphatic polyester polyols). Other commercially available products include TERATE® and TERRIN™ polyols from INVISTA, TEROL® polyols from Huntsman, LUPRAPHEN® polyols from BASF, DESMOPHEN® polyols from Covestro, FOMREZ® polyols from Chemtura, and DIEXTER™ polyols from Coim.

Suitable polyester polyols have hydroxyl value within the range of 28 to 400 mg KOH/g, from 45 to 350 mg KOH/g, from 110 to 260 mg KOH/g, or from 150 to 250 mg KOH/g. Suitable polyester polyols have an average hydroxyl functionality within the range of 1.5 to 4.0, from 1.8 to 3.5, from 1.8 to 3.0, from 1.9 to 2.1, or about 2.0.

Preferably, the polyester polyols have mostly hydroxyl end groups, not carboxylic acid end groups, and consequently will have low acid numbers, i.e., an acid number less than 5 mg KOH/g, less than 2 mg KOH/g, or less than 1 mg KOH/g.

Polyether Polyols

In some aspects, the polyol composition comprises a polyether polyol, especially a high-functionality polyether polyol. Suitable polyether polyols have average hydroxyl functionalities within the range of 1.8 to 8.0, from 2.5 to 8.0, or from 3.5 to 8.0. These polyols are readily synthesized by ring-opening polymerization of propylene oxide, ethylene oxide, butylene oxides, tetrahydrofuran, or mixtures thereof, in the presence of hydroxy- and/or amine-functional initiators. In some cases, the reactions are catalyzed by bases (e.g., KOH), transition metal catalysts (e.g., double metal cyanide catalysts), Lewis acids (e.g., $BF_3$ catalysts) or the like. A variety of diols, triols, and higher functionality starters can be used alone or in combination provided that the average hydroxyl functionality of the polyol is between 1.8 and 8.0. In some aspects, sucrose, sorbitol, or another high-functionality starter is used alone or in combination with a diol (e.g., ethylene glycol, diethylene glycol), triol (e.g., glycerin, trimethylolpropane, triethanolamine), or amine starter (e.g., ethylene diamine) to achieve a high targeted functionality within the range of 3.5 to 8.0.

Many suitable polyether polyols having average hydroxyl functionalities within the range of 1.8 to 8.0, particularly diol- or triol-initiated polyethers, are commercially available from Dow Chemical, Covestro, Huntsman, Carpenter, and other suppliers. In general, a low-functionality polyether polyol will be more desirable when it is combined with a substantial proportion (e.g., 30 wt. % or more) of a polyester polyol as described above. Examples of the high-functionality (3.5 to 8.0) polyols include the MULTRANOL® products from Covestro (e.g., MULTRANOL® 4030, MULTRANOL®4034, MULTRANOL® 4035, MULTRANOL® 4050, MULTRANOL® 4063, MULTRANOL® 6501, MULTRANOL® 8162, MULTRANOL® 8164, MULTRANOL® 9181, and MULTRANOL® 9196), the CARPOL® products from Carpenter (CARPOL® GSP-280, CARPOL® GSP-355, CARPOL® GSP-520, CARPOL® SP-477, CARPOL® SPA-357, CARPOL® SPA-530, CARPOL® EDAP-770, and CARPOL® EDAP-800), the VORANOL® products from Dow Chemical (VORANOL® 280, VORANOL® 370, and VORANOL® 490), and the JEFFOL® products from Huntsman (JEFFOL® S-490, JEFFOL® SA-499, JEFFOL® SD-361, JEFFOL® SD-441, JEFFOL® SG-360, and JEFFOL® SG-522).

In suitable polyol compositions, the polyether polyol will have a hydroxyl value within the range of 28 to 800 mg KOH/g. In some aspects, the polyether polyol will have a hydroxyl value within the range of 150 to 550 mg KOH/g.

Other Polyols

The polyol composition can include a minor proportion (e.g., up to 10, 20, or 35 wt. %) of other kinds of polyols in addition to the polyether polyol, polyester polyol, or combination thereof. For example, the composition can include a polycarbonate polyol (e.g., an ETERNACOLL® polycarbonate diol from UBE), a polycaprolactone polyol (e.g., CAPA® polycaprolactones from Perstorp), or an acrylic polyol (e.g., SETALUX® acrylic polyols from Allnex or JONCRYL® acrylic polyols from BASF).

Polyol-Epoxide Polymer (PEEP) Compositions

The reaction product of the polyepoxide compound and the polyol composition comprising a polyether or polyester polyol is a polyol-epoxide polymer, also described herein as a "PEEP" composition. PEEP compositions are distinguishable from conventional epoxy products in having a unique balance of properties.

For instance, the PEEP compositions will have a relatively low glass-transition temperature ($T_g$), as measured by differential scanning calorimetry (DSC), within the range −50° C. to 50° C. In some aspects, the T g of the PEEP composition will be within the range of −40° C. to 40° C., or from −30° C. to 30° C.

In some aspects, the PEEP compositions will have elongations (as measured by ASTM D412, Method A) of at least 10%, at least 20%, at least 40%, or at least 80%. In other aspects, the PEEP compositions will have elongations within the range of 20% to 300% or 30% to 200%.

The PEEP compositions have resonance properties that make them suitable damping materials for NVH applications. In particular, the compositions have a loss factor (or "damping" or "tan delta") of at least 0.5, preferably at least 0.6, at least 1.0, at least 1.5, or at least 2.0 by ASTM D5992 over a temperature range of at least 15 Celsius degrees at one or more frequencies within the range of 0.1 to 10,000 Hz, or 0.1 to 1000 Hz, 0.1 to 100 Hz, or 0.1 to 10 Hz, and particularly about 1 Hz. In some aspects, the PEEP compositions have a loss factor of at least 0.6 over a temperature range of at least 30 Celsius degrees, or over a temperature range of at least 60 Celsius degrees, at one or more frequencies within the range of 0.1 to 10,000 Hz, or 0.1 to 1000 Hz, or 0.1 to 10 Hz, and particularly about 1 Hz. In general, loss factors are evaluated over a wide temperature range. Typically, the loss factors indicated above will apply at a temperature within the range of −50° C. to 200° C., −40° C. to 100° C., −30° C. to 80° C., or 0° C. to 50° C.

The PEEP compositions can include additives such as surfactants, fillers, pigments, flame retardants, catalysts, viscosity modifiers, blowing agents, reactive diluents, and the like. The type and amount of additive used will depend on the requirements of the specific end-use application.

The PEEP compositions can be formulated as elastomers, microcellular elastomers, flexible foams, molded foams, rigid foams, coatings, sealants, adhesives, and other products. The compositions can be formulated to give a wide range of Shore A or Shore D hardness values. In general, the PEEP compositions will have lower hardness values compared with conventional epoxy systems. Typical hardness values will range from Shore A 40 to Shore A 99, more typically Shore A 70 to Shore A 95.

In some aspects, the PEEP compositions will have increased total energy absorption ("T.E.A.") values as determined hereinbelow when compared with those of conventional epoxy systems. The T.E.A. values will typically range from 10 to 500 lb-in./in.$^2$, to 300 lb-in./in.$^2$, or 20 to 200 lb-in./in.$^2$.

One-Component (1K) Systems

In some aspects, the PEEP composition is formulated as a one-component system. In this case, the epoxide compound, polyol composition, and a heat-activated catalyst, preferably a Lewis acid, are included in a single, storage-stable package. The components remain unreacted until they are heated, typically at a temperature within the range of 100° C. to 220° C., to effect a cure.

Suitable heat-activated Lewis acid catalysts include an electron pair acceptor such as aluminum chloride, aluminum bromide, zinc chloride, boron trichloride, boron trifluoride, tin tetrachloride, antimony pentachloride, and the like, with boron trifluoride as especially preferred.

The electron pair acceptor is bonded or strongly associated with an electron donor such that under ambient or warm conditions, the Lewis acid is essentially unreactive as a catalyst for hydroxyl-epoxide reactions. Suitable electron donors include primary and secondary amines, which strongly associate with many Lewis acids, including boron trifluoride, under these conditions.

The catalyst is "heat-activated," i.e., it melts, dissolves, or dissociates to generate a species capable of catalyzing a reaction between an epoxide group of an epoxide compound and a hydroxyl group of a polyol at temperatures greater than 50° C., 60° C., or 70° C., especially greater than 90° C. or 100° C.

Complexes of boron trifluoride and primary or secondary aliphatic or aromatic amines are preferred, and many are commercially available from Laborchemie Apolda GmbH and other suppliers. Thus, suitable $BF_3$-amine catalysts include complexes of boron trifluoride with ethylamine, di-n-butylamine, isopropylamine, piperidine, isophorone diamine, N-methylcyclohexylamine, benzylamine, aniline, N-methylaniline, and 2,4-dimethylaniline. Complexes of $BF_3$ with primary aliphatic amines, particularly ethylamine ("monoethylamine," "MEA") are preferred. In some cases, the $BF_3$-amine catalysts are supplied (or can be supplied) as mixtures with a polyol such as polyethylene glycols, polyester polyols, or other polyols.

The amount of heat-activated Lewis acid catalyst needed will depend on the nature of the epoxy compound, the nature of the polyol composition, the epoxy/hydroxyl index, the curing temperature, the particular catalyst used, and other factors. Generally, however, the amount used will be within the range of 0.1 to 10 wt. %, 1 to 5 wt. %, or 1.5 to 3.5 wt. % based on the amount of PEEP composition.

In some aspects, a one-component system comprising a mixture of the polyepoxide compound and the polyol composition are reacted in the presence of a heat-activated Lewis acid catalyst at temperature within the range of 100° C. to 220° C., or from 130° C. to 210° C., or from 160° C. to 200° C., for a time effective to cure the composition. Cure times depend on the curing temperature, catalyst level, epoxy/hydroxyl index, the desired working time, and other factors. Typically, however, cure times are within the range of several minutes to an hour, such as 10, 20, 30, 40, 50, or 60 minutes.

Two-Component (2K) Systems

In some aspects, the PEEP composition is produced from a two-component system. In this case, the formulation is not stored but is used immediately after combining the epoxide compound, the polyol mixture, and any catalyst. Two-component systems can be reacted at low temperature (e.g., room temperature) or elevated temperature, which will depend on the intended use, and the type of catalyst will be selected accordingly.

1. Elevated-Temperature Process

In some aspects, an elevated-temperature process is used to produce the 2K polyol-epoxide polymer composition. The process comprises heating, at a temperature within the range of 50° C. to 200° C., from 50° C. to 150° C., or from 50° C. to 100° C., a mixture comprising the polyepoxide compound and the polyol composition as described above.

In some aspects, this process is performed in the presence of a catalyst, for instance, a tertiary amine or a Lewis acid. Suitable Lewis acids are described below. Suitable amines include, for example, 1,4-diazabicyclo[2.2.2]octane, 2,4,6-tris(dimethyl-aminophenyl)phenol, 4-dimethylaminopyridine, N,N-dimethylbenzylamine, (4-dimethyl-aminomethyl) phenol, (2-dimethylaminomethyl)phenol, 2,4,6-tris(4-morpholinylmethyl)-phenol, or the like.

In some aspects, the mixture of polyepoxide compound and polyol composition is heated at a temperature within the range of 50° C. to 100° C., 60° C. to 90° C., or 65° C. to 80° C.

2. Low-Temperature Process

In some aspects, the 2K PEEP composition is produced at a temperature within the range of 0° C. to 45° C., more preferably under ambient conditions or without added heat. This process comprises reacting, in the presence of a catalyst comprising a base or a Lewis acid compound, the polyepoxide compound and the polyol composition as described earlier.

Some suitable catalysts comprise a Lewis acid compound. Suitable Lewis acid compounds are electron pair acceptors and include, for example, aluminum chloride, aluminum bromide, metal triflate salts (e.g., aluminum triflate), zinc chloride, boron trichloride, boron trifluoride, tin tetrachloride, antimony pentachloride, and the like. Boron trifluoride and especially complexes of boron trifluoride with electron donors (e.g., ethers, alcohols, carboxylic acids, polyols, amines, sulfides) are preferred Lewis acid compounds. Examples include boron trifluoride etherate, boron trifluoride tetrahydrofuran complexes, boron trifluoride/alcohol complexes, boron trifluoride/acetic acid complexes, boron trifluoride/phosphoric acid complexes, boron trifluoride dimethyl sulfide complexes, boron trifluoride amine complexes, boron trifluoride polyol complexes, and the like, and combinations thereof. Lewis acid complexes with ethers, alcohols, polyols, and amines are particularly preferred. Suitable catalysts include, for instance, LEECURE® B-610 and LEECURE® B-1310, complexes of boron trifluoride with a Lewis base, products of Leepoxy Plastics, Inc.

In other aspects, the low-temperature process is performed in the presence of a base catalyst. Amine catalysts are preferred. In some preferred aspects, the amine catalyst comprises an amine compound, a polyamine, a polyamide, or a mixture thereof. Tertiary amines are preferred amine compounds. Suitable amine catalysts include, for example, 1,4-diazabicyclo[2.2.2]octane, 2,4,6-tris(dimethylaminomethyl)phenol (e.g., "DMP-30"), 4-dimethylaminopyridine, N,N-dimethylbenzylamine, (4-dimethylamino-methyl)phenol, (2-dimethylaminomethyl)phenol, 2,4,6-tris(4-morpholinylmethyl)phenol, 1,3,5-tris(3-(dimethylamino)propyl)hexahydro-s-triazine (e.g., POLYCAT® 41 from Air Products or JEFFCAT® TR-90 from Huntsman), and the like, and mixtures thereof.

The amount of Lewis acid or base catalyst required for good curing will depend on many factors that are within the skilled person's discretion, including the nature of the polyepoxide compound, the nature of the polyol composition, the particular catalyst selected, the kind of product (e.g., coating, adhesive, elastomer), the product dimensions, the desired pot life, the open time, and other factors. Generally, however, the amount of catalyst will be within the range of 0.01 to 10 wt. %, or 0.1 to 8 wt. %, or 1 to 5 wt. % based on the amount of PEEP composition produced.

The low-temperature process is performed at a temperature within the range of 0° C. to 45° C., or 10° C. to 30° C., or in many cases, at room temperature.

NVH Applications

The PEEP compositions can be formulated as coatings, adhesives, elastomers, sealants, foams, or microcellular elastomers for applications requiring loss factors of at least 0.5 by ASTM D5992 over at least 15 Celsius degrees at one or more frequencies within the range of 0.1 Hz to 10,000 Hz. In some aspects, the cured PEEP composition is the complete NVH component or part. In other aspects, the PEEP composition is one element of a larger part or system of components. For instance, the PEEP composition may be used to coat, seal, or bond other materials that are part of the overall NVH-reduction system. In some aspects, the PEEP composition is ground into a powder, granules, or other particulate form and is used as an additive to impart NVH damping to composite compositions. For instance, particulate PEEP materials ("pPEEPs") can be combined with gypsum and other materials to produce gypsum wallboard having NVH properties. In other aspects, pPEEPs are incorporated into a pressure-sensitive adhesive or a coating to impart NVH damping properties.

Many industrial and consumer products benefit from NVH damping. Examples permeate industries as diverse as energy, transportation, construction, home appliances, electronics (including electronics encapsulation), sporting goods, recreational vehicles, power tools, and others. The compositions are well-suited for use as construction or transportation adhesives. A wide range of parts for motor vehicles, watercraft, aircraft, snowmobiles, recreational vehicles, and the like, benefit from NVH damping. Home appliances (refrigerators, air conditioners, dishwashers, washing machines, dryers, vacuum cleaners, mixers, portable fans, ceiling fans, and the like) and electronic equipment (computers, printers, televisions, stereo equipment, etc.) also benefit from the availability of these materials. Sporting goods (golf clubs, aluminum bats; protective gear for hockey, football, or baseball; snowboards, skis, etc.) are another potential outlet. In the energy sector, NVH damping is needed for drilling operations and equipment, wind turbines, and HVAC equipment. Power tools such as snow blowers, lawn mowers, leaf blowers, table saws, and the like, are more good candidates for NVH damping.

The following examples merely illustrate the invention; the skilled person will recognize many variations that are within the spirit of the invention and scope of the claims.

Formulation Components:

EPON® 828 (Hexion Specialty Chemicals): a liquid bisphenol A diglycidyl ether-based epoxy resin. Avg. equiv. wt.: 189. Viscosity: 13,000 cP at 25° C.

EPALLOY® 5000 (CVC Thermoset Specialties): diepoxide of the cycloaliphatic alcohol, hydrogenated bisphenol A. Avg. equiv. wt.: 220 g/equiv. Viscosity: 1300-2500 cP at 25° C.

EPALLOY® 8240 (CVC Thermoset Specialties): epoxy novolac resin. Avg. equiv. wt.: 170 g/equiv. Viscosity: 6000-7100 cP at 25° C.

STEPANPOL® PC-107-210 (Stepan Company): aliphatic polyester polyol from neopentyl glycol and adipic acid. OH value: 210 mg KOH/g. Functionality: 2.0.

STEPANPOL® PC-1011P-210 (Stepan Company): aliphatic polyester polyol from diethylene glycol and adipic acid. OH value: 210 mg KOH/g. Functionality: 2.0.

STEPANPOL® PC-1028P-115 (Stepan Company): aromatic polyester polyol from 1,6-hexanediol and phthalic anhydride. OH value: 115 mg KOH/g. Functionality: 2.0.

STEPANPOL® PC-1028P-210 (Stepan Company): aromatic polyester polyol from 1,6-hexanediol and phthalic anhydride. OH value: 210 mg KOH/g. Functionality: 2.0.

STEPANPOL® PC-2011-45 (Stepan Company): aliphatic polyester polyol from diethylene glycol and adipic acid. OH value: 45 mg KOH/g. Functionality: 2.0.

STEPANPOL® PDP-70 (Stepan Company): hybrid aromatic polyester polyol. OH value: 70 mg KOH/g. Functionality: 2.0.

STEPANPOL® PS-1752 (Stepan Company): aromatic polyester polyol from phthalic anhydride and diethylene glycol. OH value: 175 mg KOH/g. Functionality: 2.0.

STEPANPOL® PS-2002 (Stepan Company): aromatic polyester polyol from phthalic anhydride and diethylene glycol. OH value: 200 mg KOH/g. Functionality: 2.0.

STEPANPOL® PS-2352 (Stepan Company): modified aromatic polyester polyol. OH value: 240 mg KOH/g. Functionality: 2.0.

STEPANPOL® PS-2402L (Stepan Company): aromatic polyester polyol from phthalic anhydride and diethylene glycol. OH value: 236 mg KOH/g. Functionality: 2.0.

STEPANPOL® PS-2602 (Stepan Company): modified phthalic anhydride-based aromatic polyester polyol. OH value: 260 mg KOH/g. Functionality: 2.0.

IPA-DEG polyol: aromatic polyester polyol from isophthalic acid and diethylene glycol. OH value: 241 mg KOH/g. Functionality: 2.0.

IPA-DEG-MPD polyol: aromatic polyester polyol from isophthalic acid, diethylene glycol, and 2-methyl-1,3-propanediol. OH value: 243 mg KOH/g. Functionality: 2.0.

TPA-DEG polyol: aromatic polyester polyol from terephthalic acid and diethylene glycol. OH value: 238 mg KOH/g. Functionality: 2.0.

TPA-DEG-MPD polyol: aromatic polyester polyol from terephthalic acid, diethylene glycol, and 2-methyl-1,3-propanediol. OH value: 245 mg KOH/g. Functionality: 2.0.

$BF_3$-MeOH complex (Honeywell).

Catalyst/polyol mixture: 9.0 wt. % $BF_3$-MeOH complex in STEPANPOL® PS-2402L.

Preparation of IPA-DEG Polyol

Isophthalic acid (2134 g) and diethylene glycol (2328 g) are charged to a reaction vessel equipped with mechanical stirring, a thermocouple, a nitrogen inlet, and a distillation head. The mixture is heated to 220° C. under a nitrogen sparge. Distillate is rapidly removed. After heating for 5.5 h, titanium tetrabutoxide (1.2 g) is added. Heating continues until the acid value is less than 1 mg KOH/g. Final analysis shows: acid value: 0.66 mg KOH/g; hydroxyl value (corrected): 241 mg KOH/g; water: 0.01%; viscosity (25° C.): 25,200 cP; viscosity (80° C.): 240 cP.

Preparation of TPA-DEG Polyol

Terephthalic acid (2134 g) and diethylene glycol (2328 g) are charged to a reaction vessel equipped as described above. The mixture is heated to 220° C. under a nitrogen sparge. Distillate is rapidly removed. After heating for 5.5 h, titanium tetrabutoxide (1.2 g) is added. Heating continues until the acid value is less than 1 mg KOH/g. Final analysis shows: acid value: 0.67 mg KOH/g; hydroxyl value (corrected): 238 mg KOH/g; water: 0.02%; viscosity (25° C.): 18,100 cP.

Preparation of IPA-DEG-MPD Polyol

Isophthalic acid (1293 g), diethylene glycol (1498 g), and 2-methyl-1,3-propanediol (685 g) are charged to a reaction vessel equipped as described above. The mixture is heated to 60° C. and then the remaining isophthalic acid (900 g) is added. The mixture is heated to 200° C. under nitrogen. When the acid value reaches 20 mg KOH/g, titanium tetrabutoxide (1.31 g) is added. Heating continues until the acid value is less than 0.70 mg KOH/g. Diethylene glycol (48.7 g) and 2-methyl-1,3-propanediol (22.3 g) are added after the temperature is reduced to 180° C. to adjust the hydroxyl value. Final analysis shows: acid value: 0.38 mg KOH/g; hydroxyl value (corrected): 243 mg KOH/g; water: 0.01%; viscosity (25° C.): 66,300 cP; viscosity (80° C.): 421 cP.

Preparation of TPA-DEG-MPD Polyol

Terephthalic acid (2250 g), diethylene glycol (1536 g), and 2-methyl-1,3-propanediol (703 g) are charged to a reaction vessel equipped as described above. The mixture is heated to 220° C. under nitrogen. When the acid value reaches 19 mg KOH/g, titanium tetrabutoxide (1.15 g) is added. When the acid value reaches 0.36 mg KOH/g and the hydroxyl value is 226 mg KOH, diethylene glycol (57.5 g) and 2-methyl-1,3-propanediol (26.4 g) are added after the temperature is reduced to 180° C. to adjust the hydroxyl value. Final analysis shows: acid value: 0.36 mg KOH/g; hydroxyl value (corrected): 245 mg KOH/g; water: 0.01%; viscosity (25° C.): 34,600 cP; viscosity (80° C.): 305 cP.

Two-Component (2K) PEEP Formulations

EPON® 828 resin is used for all formulations. Polyols are used alone or as 1:1 (by weight) blends. The catalyst used is a mixture of 9.0 wt. % $BF_3$-MeOH complex dissolved in STEPANPOL® PS-2402L. The amount of catalyst used is an amount that provides 2-4 minutes of working time, which is determined empirically. Formulations are made by mixing the polyol or polyol blend with the epoxy resin, then adding the desired amount of catalyst. The index, or ratio of epoxy to hydroxyl equivalents, is held below 150, generally between 90 and 135, to maximize flexibility for some NVH applications.

Elastomer Preparation

Figure 10:
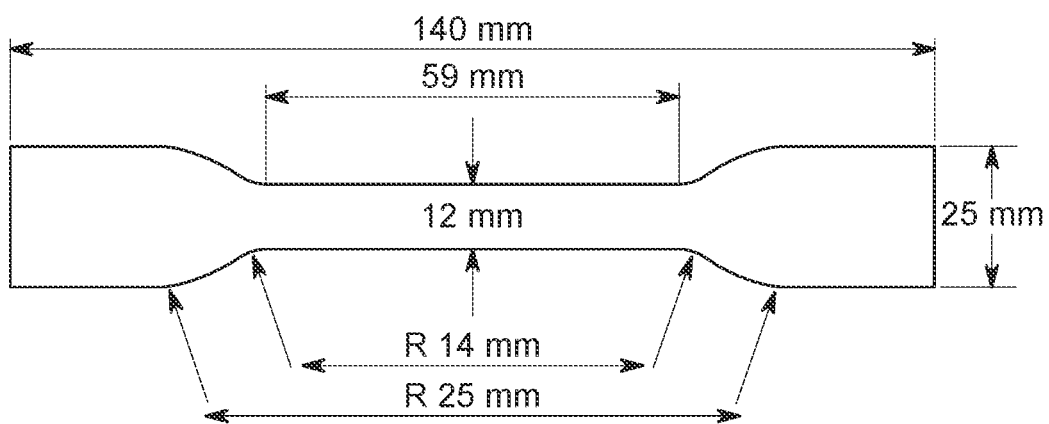
FIG. 10 is an illustration of a dogbone sample.

After combining the reactants, the 2K PEEP formulation (100 g) is poured into a 7"×7"×1/16" aluminum mold (ambient conditions, coated with mold release). The formulation is allowed to spread evenly, is covered overnight, and is allowed to cure at room temperature for 7 days before testing. For each formulation, two plaques are produced: one for NVH testing, the other for mechanical property evaluation. For the latter tests, five dogbone samples are cut using a die having the dimensions shown in FIG. 10. Samples are cut and conditioned at 23° C.±2° C. and 50%±5% relative humidity for 1 h prior to physical testing.

Mechanical Properties

A universal testing machine (MTS ReNew™ system) and TestWorks® 4.11 software are used for sample testing and analysis. The central test portion of the dogbone samples is 12 mm wide and 59 mm long. Samples are placed in grips spaced 2.25" apart. A 1000 lb. load cell is used to measure properties at a tensile pull rate of 2"/min until sample breakage. Tensile strength, modulus, elongation-at-break, and total energy absorbed are measured at least in duplicate and averaged.

Total energy absorbed ("T.E.A.") is calculated by the universal testing machine software (Testworks 4.11) and obtained by normalizing the area under the stress-strain curve by the surface area of the central test portion (tapered portion) of the dogbone sample. The area under the stress-strain curve is calculated from the product of the total force (pounds) required to produce extension of the sample up to breakage (inches). For each sample, the surface area is 0.825 in.$^2$. Total energy absorbed is a measurement that allows for comparison of the relative toughness of each sample tested. The units of T.E.A. are lb-in./in.$^2$.

Hardness

Hardness of cured polymer samples is determined using a Type A durometer (Pacific Transducer, Model 306L) according to ASTM 2240-05. The dogbone samples described earlier are used.

Mechanical properties and hardness measurements are performed at 23° C.±2° C. and 50%±5% relative humidity.

Glass-Transition Temperature

Glass-transition temperatures ($T_g$) are determined using a TA Instruments Discovery Series differential scanning calorimeter and Trios (V3.2) software from TA Instruments. Samples are prepared by trimming a 10-20 mg piece from the dogbone samples used for mechanical property testing. The sample is accurately weighed, crimped in the test pan, and placed in the sample holder of the instrument along with a reference pan. The sample is cooled to −50° C. and then warmed from −50° C. to 150° C. at 10° C. per minute. PEEP compositions can exhibit a wide range of T g values as evidenced by the values reported below in Tables 1-3, 5, and 7.

Dynamic Mechanical Analysis: NVH Performance

Figure 9:
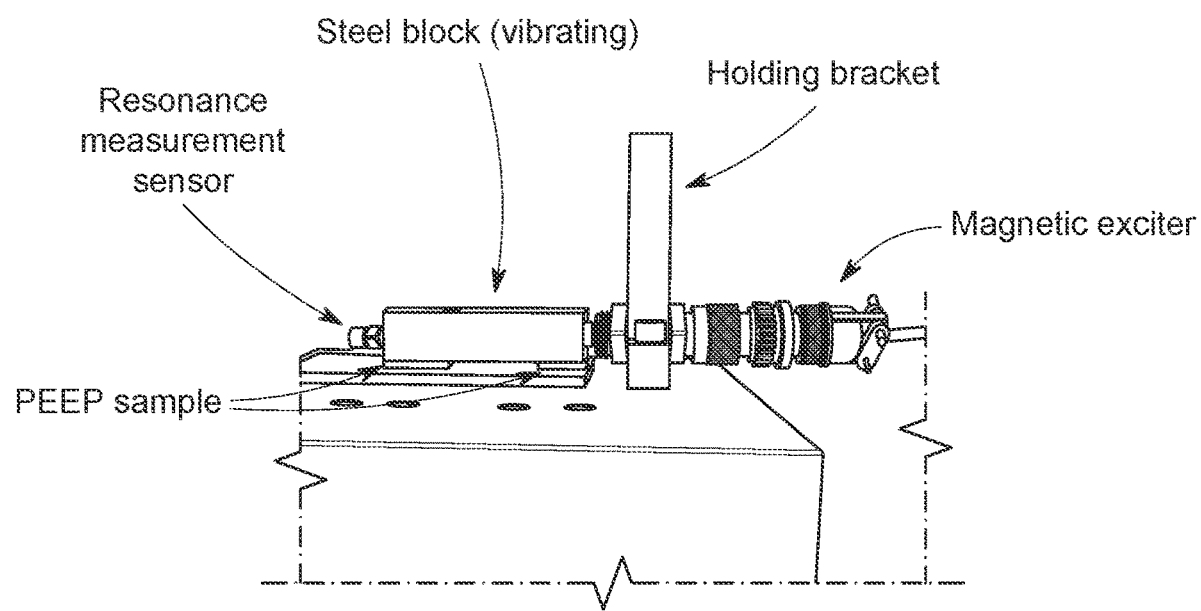
FIG. 9 is a drawing showing the apparatus used for resonance testing according to ASTM D5992.

An outside testing lab having expertise in dynamical testing of rubber-like materials using vibratory methods evaluates samples in accord with a resonance test based on ASTM D5992. FIG. 9 shows the apparatus used to evaluate the samples.

Test samples of polyester-epoxide polymers having thicknesses within the range of 0.075" to 0.130" are evaluated. A steel test block (0.75"×1"×2.5") is placed on top of a pair of test specimens, bonded with a two-part epoxy. Standard resonance shear specimens are mounted in a test fixture designed to provide a firm boundary condition for the forced resonant vibration system. Excitation, in the form of random white noise, is provided by a non-contacting magnetic exciter, which is located close to a metal excitation screw. The response of the standard resonance shear samples is measured with an accelerometer located on the opposite side of the metal excitation screw. The test fixture is placed in an environmental chamber so that the effects of temperature on properties can be defined. A temperature range of −46° C. to 121° C. is evaluated. The frequency response functions of the shear specimens are collected at the mode of interest and processed to obtain viscoelastic properties of the polymer samples. For each tested sample, shear storage modulus and loss factor are evaluated as function of temperature at 10 Hz, 100 Hz, or 1000 Hz.

Results:

FIGS. 1-3 and 5-7 show results from the resonance test for the PEEP samples of Examples 11 and 14, respectively. When the loss factor is at least 0.6, shown by the shaded regions above the labeled horizontal line, the test material provides a desirable degree of damping. The temperatures at which the loss factor (damping) is favorable (i.e., 0.6) generally depend on the vibrational frequency. As the frequency increases, the favorable loss factor range tends to shift toward higher temperatures.

Figure 4:
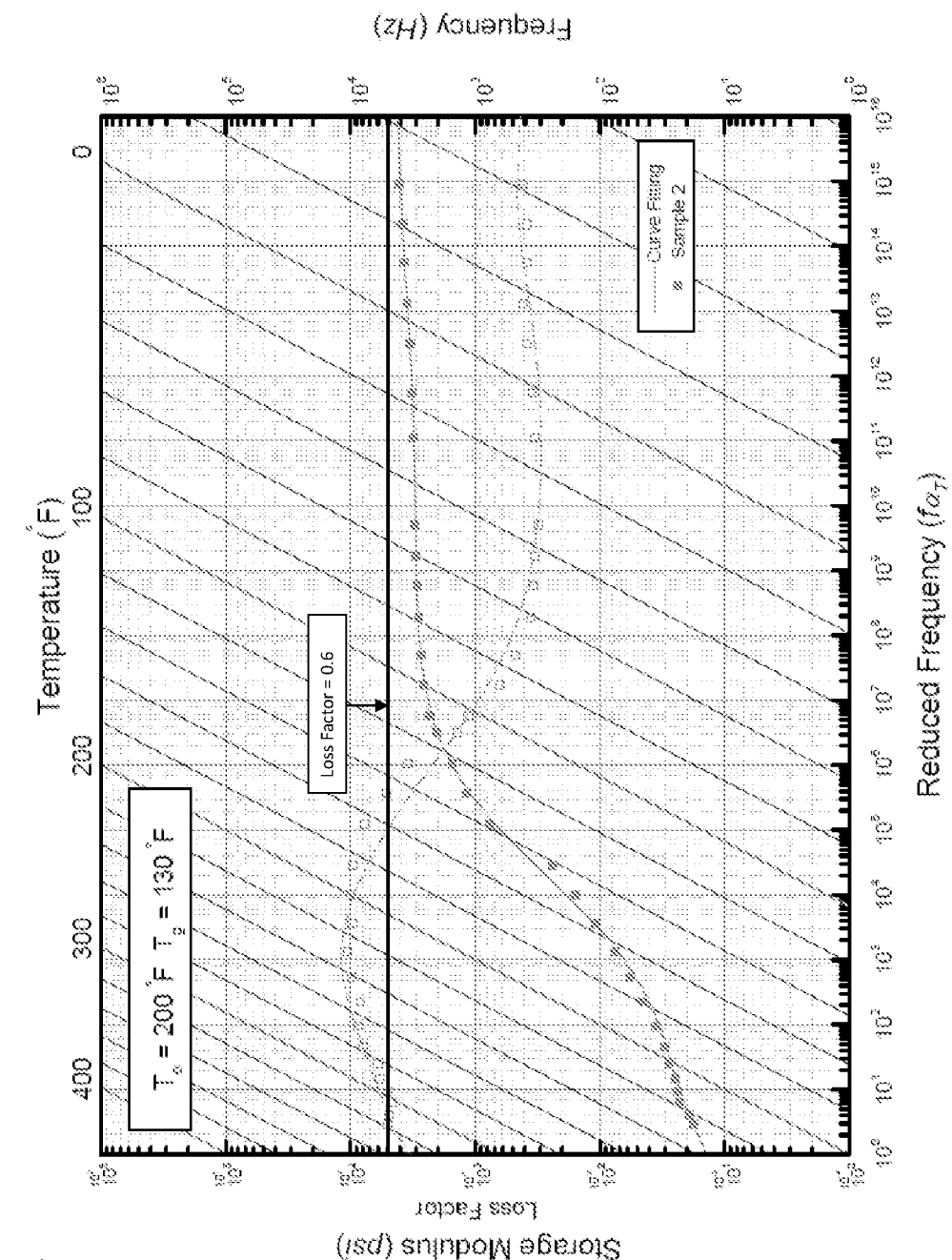
FIG. 4 is a nomogram that combines the results of the experiments from FIGS. 1-3 into a single graph with loss factors (log scale) and storage modulus (log scale) on the left vertical axis, frequency (log scale) on the right vertical axis, reduced frequency (log scale) on the bottom horizontal axis, and diagonals to show values at a given temperature.
Figure 5:
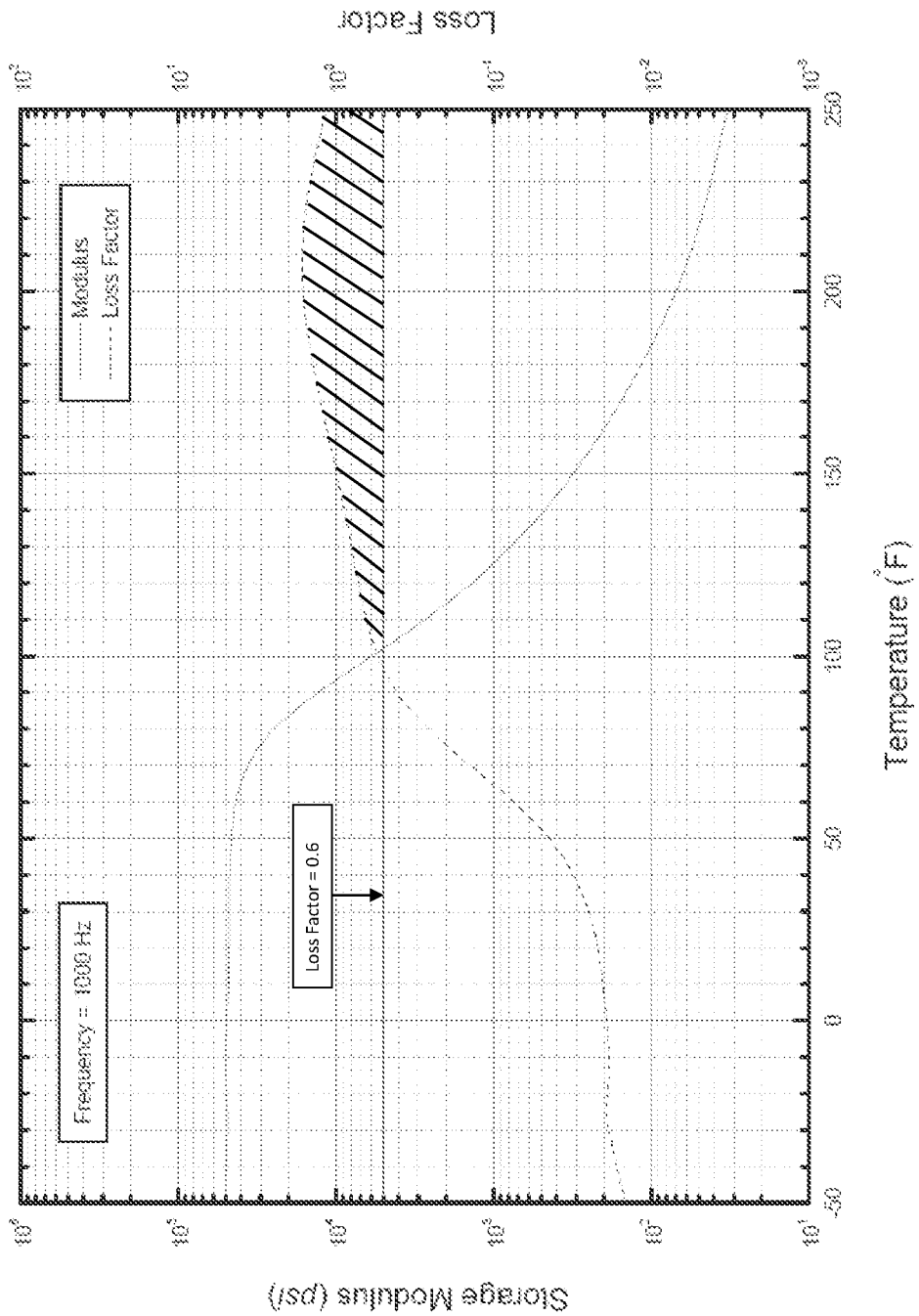
FIG. 5 is a plot from resonance testing according to ASTM D5992 of a second PEEP composition showing storage modulus (log scale) and loss factor (log scale) as a function of temperature at a constant frequency of 1000 Hz.
Figure 6:
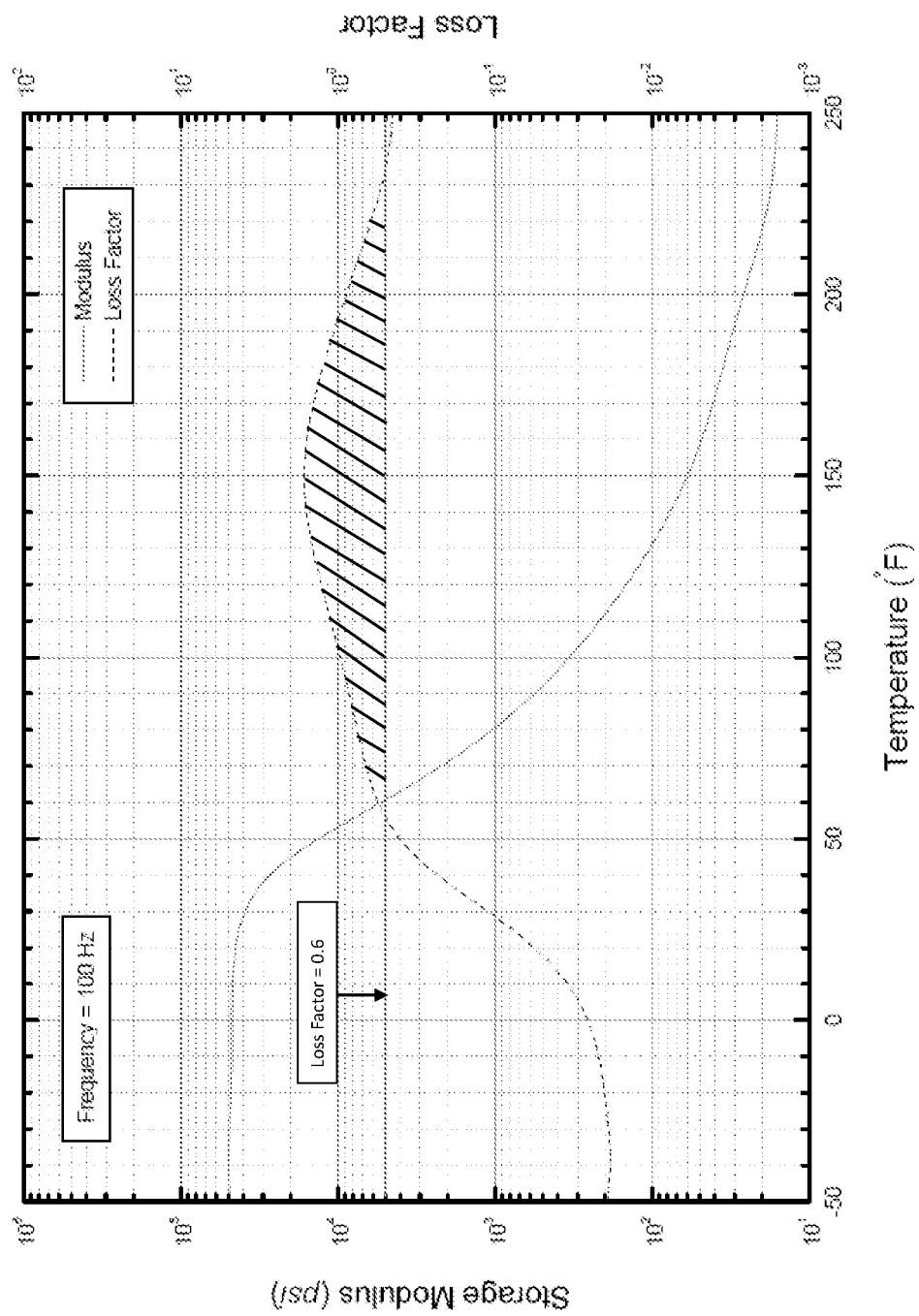
FIG. 6 is like FIG. 5 but measured at 100 Hz.
Figure 7:
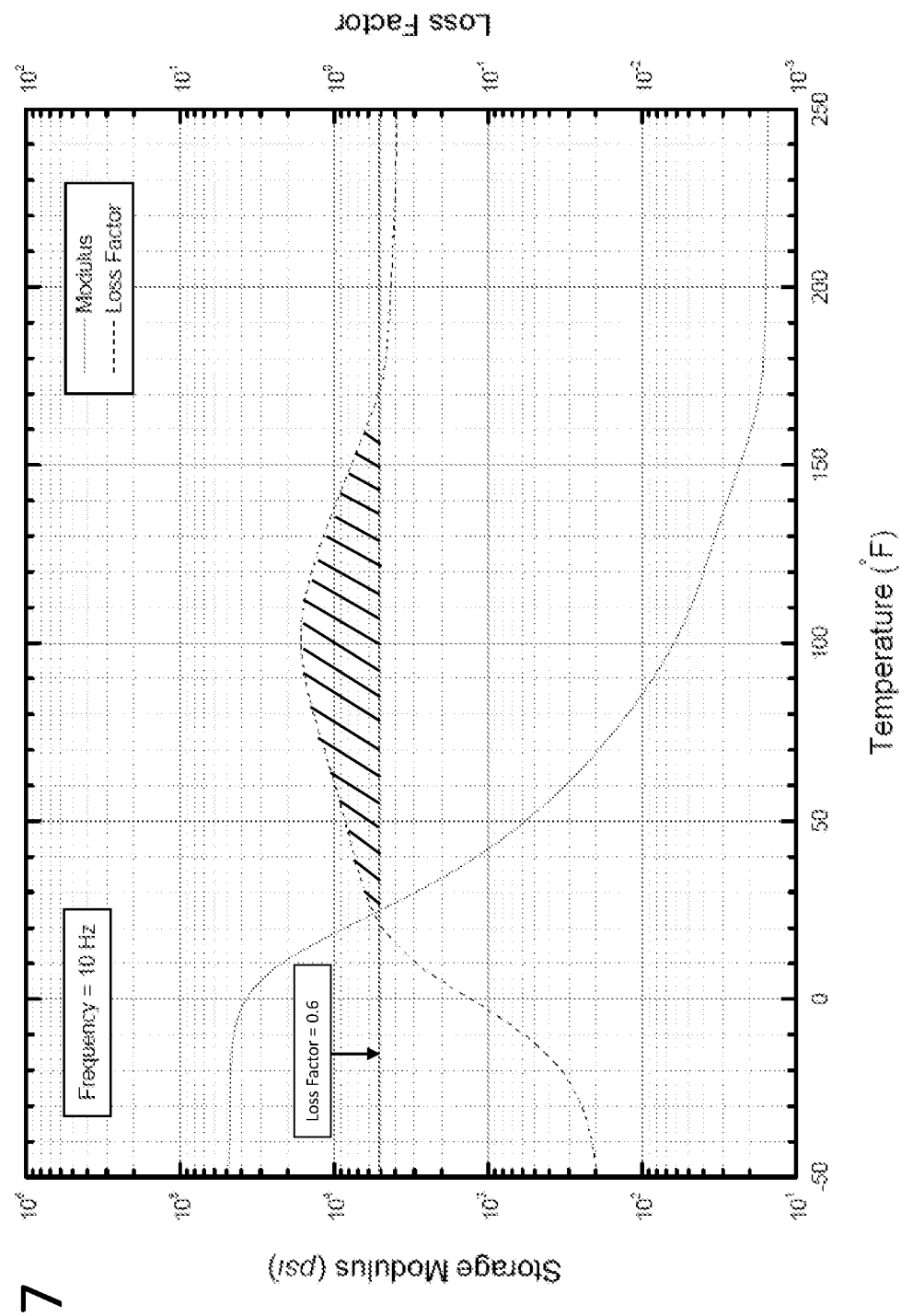
FIG. 7 is like FIG. 5 but measured at 10 Hz.
Figure 8:
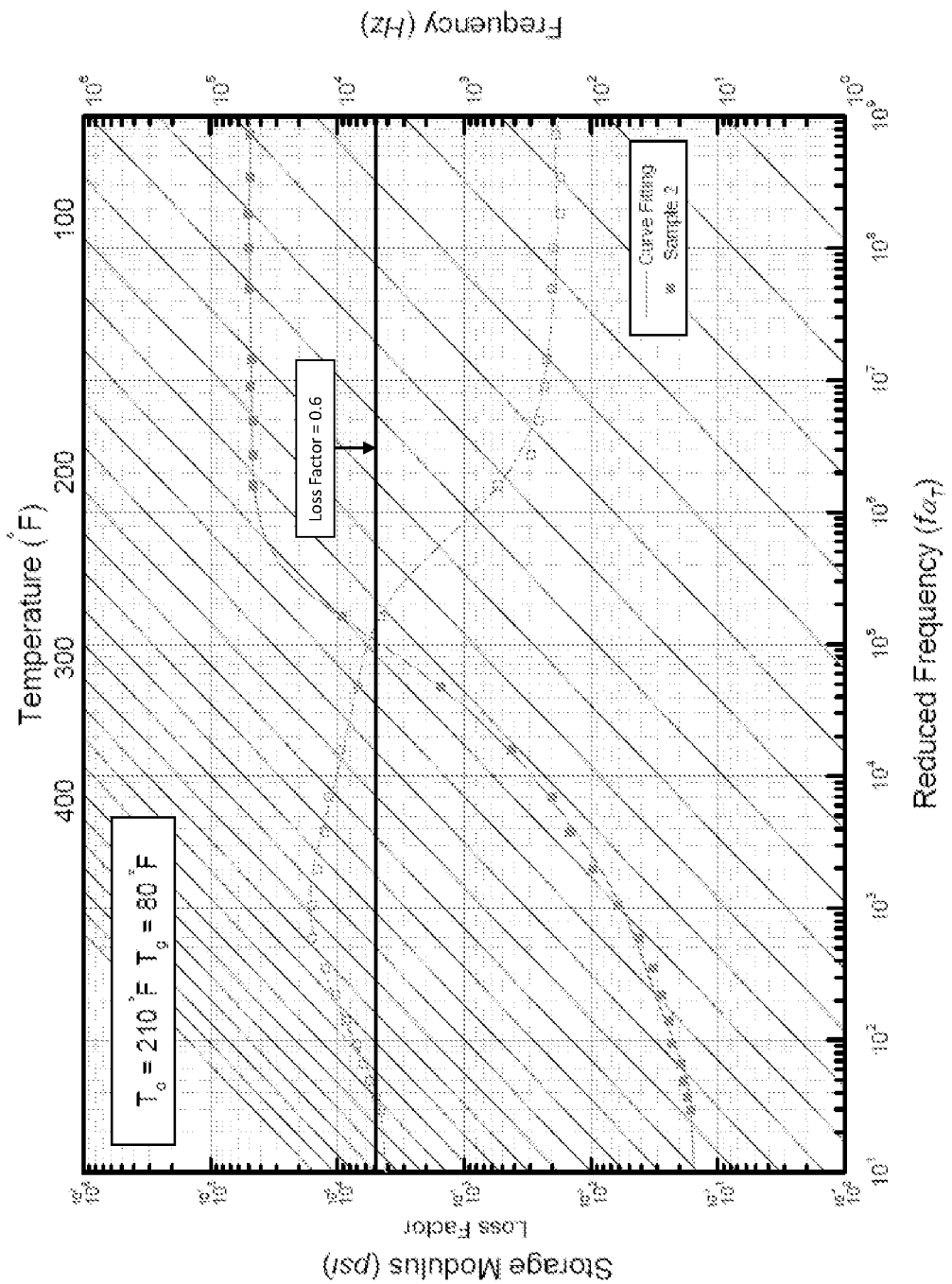
FIG. 8 is a nomogram that combines the results of the experiments from FIGS. 5-7 into a single graph with loss factors (log scale) and storage modulus (log scale) on the left vertical axis, frequency (log scale) on the right vertical axis, reduced frequency (log scale) on the bottom horizontal axis, and diagonals to show values at a given temperature.

FIGS. 4 and 8 are reduced temperature-frequency nomograms that incorporate all of the data for a given sample on one graph. The nomograms suggest the temperature range over which a sample will provide valuable damping properties (loss factor 0.6). To read the nomogram: (1) select a frequency of interest on the right-hand axis; (2) follow the chosen frequency (horizontal line) to the desired diagonal temperature isotherm; (3) go vertically to intersect the shear storage modulus and loss factor curves; and (4) draw horizontal lines from the intersect points to the left and read the storage modulus or loss factor value from the appropriate left vertical scale.

For FIGS. 4 and 8, the region of loss factors ≥0.6 appears on the upper left portion of the graph. For the PEEP composition of Example 11 (FIG. 4), the temperature range applicable to desirable loss factors is 160° F. to 300° F. (71° C. to 149° C.), or a range of about 80 Celsius degrees, a desirably broad range of temperatures at which the loss factor is favorable within the 10 to 1000 Hz range of frequencies. For the PEEP composition of Example 14 (FIG. 8), the temperature range applicable to desirable loss factors is 140° F. to 380° F. (60° C. to 193° C.), an even broader range of about 130 Celsius degrees within the 10 Hz to 1000 Hz frequency range.

Favorable loss factor results are also obtained when other PEEPs samples (from Examples 10, 12, and 13) are tested, and these results are summarized in Table 3. Overall, the results suggest that the tested PEEP samples will provide noise/vibration damping at elevated temperatures (−50° C. to 200° C.), a range applicable to aerospace, engines, appliances and other home or industrial uses for which such elevated operating temperatures are common. The products of Examples 11 and 14, because of their good damping properties over an exceptionally broad range of useful temperatures, suggest that certain PEEP compositions could be valuable for reducing the variability in damping performance of the materials as a function of changes in operating temperature.

Additional Dynamic Mechanical Analysis (DMA) Studies

A series of two-component PEEP elastomers is prepared generally as described previously using the components and proportions indicated in Tables 4 and 6. The catalyst used is again a mixture of 9.0 wt. % $BF_3$-MeOH complex dissolved in STEPANPOL® PS-2402L. The resulting products are evaluated using the equipment and methodology described below.

A Discovery DMA 850 (TA Instruments) using TRIOS software equipped with a dual/single cantilever system and ACS3 chiller system is used for the DMA measurements summarized in Tables 5 and 7. The instrument is used to conduct oscillatory thermal ramp measurements of viscoelastic properties (storage modulus (MPa), loss modulus (MPa), and tan delta) for the cured PEEP materials. The measurements are performed at 1 Hz, which provides the most consistent results with this instrument for these compositions. Temperature limits of the measurement vary based on DSC-measured $T_g$ (° C.) to ensure inclusion of the full viscoelastic region of each material. Measurement temperatures range from −60° C. to 150° C. and increase at a ramp rate of 3° C./min. Oscillatory tests (as opposed to the force, stress, or strain options) control the amplitude parameter.

The DMA results reported in Tables 4-7 demonstrate that PEEP materials useful for a wide range of NVH applications can be targeted. The results are sorted into "low-temperature" and "high-temperature" categories, but it is apparent from these results that formulators can adjust properties by combining different kinds of polyepoxide compounds and polyols at various indices (i.e., epoxy/OH molar ratios) to generate PEEP compositions having desirable peak tan delta values (especially, ≥1.0), a wide range of temperatures over which the tan delta value is ≥0.5 (preferably ≥1.0), and either relatively low or high temperatures at which the onset of damping properties will occur.

The preceding examples are meant only as illustrations; the following claims define the inventive subject matter.

TABLE 1

Elastomers from Polyol-Epoxide Polymers: Group I

| Example | 1 | 2 | 3 | 4 | 5 |
|---|---|---|---|---|---|
| PEEP Composition | | | | | |
| Polyol[1,2] | IPA-DEG | TPA-DEG | PC-1028P-210 | IPA-DEG + PC-1028P-210 (1:1 by wt.) | TPA-DEG + PC-1028P-210 (1:1 by wt.) |
| OH value (mg KOH/g) | 241 | 238 | 218 | 229 | 228 |
| Polyol OH functionality | 2.0 | 2.0 | 2.0 | 2.0 | 2.0 |
| Epoxy compound[3] | EPON ® 828 | EPON ® 828 | EPON ® 828 | EPON ® 828 | EPON ® 828 |
| Epoxy/polyester (wt/wt) | 50.2/49.1 | 50.2/49.1 | 49.8/46.8 | 49.0/50.0 | 48.9/50.1 |
| Epoxy/OH index | 125 | 125 | 130 | 125 | 125 |
| Catalyst/polyol mix[4] (wt. %) | 0.7 | 0.7 | 3.4 | 1.0 | 1.0 |
| Cast elastomer properties | | | | | |
| Shore A hardness | 98 | 95 | 97 | 97 | 97 |
| Peak stress (psi) | 3480 | 5490 | 1590 | 1900 | 2090 |
| Modulus (kpsi) | 108 | 139 | 38 | 77 | 85 |
| Elongation at break (%) | 50 | 5.8 | 135 | 143 | 115 |
| Total energy absorbed (lb · in./in.²) | 93 | 21 | 167 | 235 | 189 |
| $T_g$ (° C.) | 25 | 29 | 21 | 23 | 24 |

[1]STEPANPOL ® PC-1028P-210 is a product of Stepan Company.
[2]DEG = diethylene glycol; IPA = isophthalic acid; TPA = terephthalic acid;
[3]EPON ® 828 is a product of Hexion Specialty Chemicals.
[4]9.0 wt. % BF$_3$—MeOH complex in STEPANPOL ® PS-2402L.

TABLE 2

Elastomers from Polyol-Epoxide Polymers: Group II

| Example | 6 | 7 | 8 | 9 |
|---|---|---|---|---|
| PEEP Composition | | | | |
| Polyol[1,2] | IPA-DEG + PC-1028P-210 (1:1 by wt.) | TPA-DEG + PC-1028P-210 (1:1 by wt.) | TPA-DEG-MPD + PC-1028P-210 (1:1 by wt.) | TPA-DEG-MPD + PC-1028P-210 (1:1 by wt.) |
| OH value (mg KOH/g) | 231 | 228 | 231 | 231 |
| Polyol OH functionality | 2.0 | 2.0 | 2.0 | 2.0 |
| Epoxy compound[3] | EPON ® 828 | EPON ® 828 | EPON ® 828 | EPON ® 828 |
| Epoxy/polyester (wt/wt) | 49.2/49.2 | 49.3/49.9 | 46.1/52.1 | 41.2/56.9 |
| Epoxy/OH index | 125 | 125 | 110 | 90 |
| Catalyst/polyol mix[4] (wt. %) | 1.6 | 0.8 | 1.8 | 2.0 |
| Cast elastomer properties | | | | |
| Shore A hardness | 98 | 97 | 98 | 67 |
| Peak stress (psi) | 3890 | 4020 | 1170 | 137 |
| Modulus (kpsi) | 118 | 120 | 29 | 0.1 |
| Elongation at break (%) | 5.9 | 6.4 | 156 | 258 |

TABLE 2-continued

Elastomers from Polyol-Epoxide Polymers: Group II

| Example | 6 | 7 | 8 | 9 |
|---|---|---|---|---|
| Total energy absorbed (lb · in./in.$^2$) | 18 | 21 | 163 | 24 |
| $T_g$ (° C.) | 27 | 28 | 22 | 9 |

[1]STEPANPOL ® PC-1028P-210 is a product of Stepan Company.
[2]DEG = diethylene glycol; MPD = 2-methyl-1,3-propanediol; TPA = terephthalic acid;
[3]EPON ® 828 is a product of Hexion Specialty Chemicals.
[4]9.0 wt. % BF$_3$—MeOH complex in STEPANPOL ® PS-2402L.

TABLE 3

Elastomers from Polyol-Epoxide Polymers: Group III

| Example | 10 | 11 | 12 | 13 | 14 |
|---|---|---|---|---|---|
| PEEP Composition | | | | | |
| Polyol[1,2] | PC-1028P-210 | IPA-DEG-MPD | IPA-DEG-MPD + PC-1028P-210 (1:1 by wt.) | IPA-DEG-MPD + PC-1028P-210 (1:1 by wt.) | IPA-DEG-MPD + PC-1028P-210 (1:1 by wt.) |
| OH value (mg KOH/g) | 218 | 243 | 231 | 231 | 231 |
| Polyol OH functionality | 2.0 | 2.0 | 2.0 | 2.0 | 2.0 |
| Epoxy compound[3] | EPON ® 828 | EPON ® 828 | EPON ® 828 | EPON ® 828 | EPON ® 828 |
| Epoxy/polyester (wt/wt) | 49.7/49.0 | 42.4/56.4 | 49.2/50.0 | 46.0/52.2 | 41.1/56.9 |
| Epoxy/OH index | 135 | 90 | 125 | 110 | 90 |
| Catalyst/polyol mix[4] (wt. %) | 1.3 | 1.2 | 0.8 | 1.8 | 2.0 |
| Cast elastomer properties | | | | | |
| Shore A hardness | 97 | 94 | 97 | 97 | 79 |
| Peak stress (psi) | 1780 | 889 | 3310 | 1020 | 167 |
| Modulus (kpsi) | 36 | 35 | 116 | 25 | 0.2 |
| Elongation at break (%) | 137 | 193 | 19 | 150 | 293 |
| Total energy absorbed (lb · in./in.$^2$) | 180 | 183 | 56 | 125 | 30 |
| $T_g$ (° C.) | 22 | 20 | 26 | 20 | 9 |
| NVH evaluation | | | | | |
| Loss factor (ASTM D5992) | ≥0.5 | ≥0.5 | ≥0.5 | ≥0.5 | ≥0.5 |
| Temp. range,[5] ° F. (° C.) | 145-175 (63-79) | 160-300 (71-149) | 120-200 (49-93) | 140-190 (60-88) | 140-380 (60-193) |
| Spread, Fahrenheit degrees (Celsius degrees) | 30 (17) | 140 (78) | 80 (44) | 50 (28) | 240 (133) |

[1]STEPANPOL ® PC-1028P-210 is a product of Stepan Company.
[2]DEG = diethylene glycol; MPD = 2-methyl-1,3-propanediol; IPA = isophthalic acid.
[3]EPON ® 828 is a product of Hexion Specialty Chemicals.
[4]9.0 wt. % BF$_3$—MeOH complex in STEPANPOL ® PS-2402L.
[5]Temperature range within which the loss factor is ≥0.5.

TABLE 4

PEEP Formulations for "Low-Temperature" NVH Applications

| Ex. | Epoxide[1] | Wt. % epoxide | Polyol[2] | Wt. % polyol | PEEP index | OH value (mg KOH/g) | Catalyst[3], wt. % |
|---|---|---|---|---|---|---|---|
| 15 | EPON ® 828 | 42.4 | PC-1011P-210 | 55.4 | 100 | 210 | 0.20 |
| 16 | EPON ® 828 | 42.4 | PC-1011P-210 | 55.7 | 100 | 210 | 0.18 |
| 17 | EPALLOY ® 5000 | 47.0 | PC-1011P-210 | 51.0 | 100 | 210 | 0.18 |
| 18 | EPALLOY ® 5000 | 47.1 | PC-1011P-210 | 51.3 | 100 | 210 | 0.15 |
| 19 | EPON ® 828 | 29.3 | PC-1028P-115 | 65.7 | 100 | 115 | 0.45 |
| 20 | EPALLOY ® 5000 | 15.8 | PC-2011-45 | 81.9 | 100 | 45 | 0.20 |
| 21 | EPON ® 828 | 20.0 | PDP-70 | 77.8 | 100 | 70 | 0.20 |
| 22 | EPON ® 828 | 21.6 | PDP-70 | 72.9 | 100 | 70 | 0.50 |
| 23 | EPON ® 828 | 21.6 | PDP-70 | 72.9 | 100 | 70 | 0.50 |
| 24 | EPALLOY ® 5000 | 21.9 | PDP-70 | 75.9 | 100 | 70 | 0.20 |
| 25 | EPALLOY ® 5000 | 23.7 | PDP-70 | 70.8 | 100 | 70 | 0.50 |

TABLE 4-continued

PEEP Formulations for "Low-Temperature" NVH Applications

| Ex. | Epoxide[1] | Wt. % epoxide | Polyol[2] | Wt. % polyol | PEEP index | OH value (mg KOH/g) | Catalyst[3], wt. % |
|---|---|---|---|---|---|---|---|
| 26 | EPALLOY ® 5000 | 39.0 | PDP-70 | 60.1 | 100 | 175 | 0.075 |
| 27 | EPON ® 828 | 26.1 | PDP-70/ PPG-1000 (1:1) | 66.6 | 100 | 91 | 0.65 |

[1]EPON ® 828 is a product of Hexion Specialty Chemicals. EPALLOY ® 5000 is a product of CVC Thermoset Specialties.
[2]STEPANPOL ® PC-1011P-210, STEPANPOL ® PC-1028P-115, STEPANPOL ® PC-2011-45, and STEPANPOL ® PDP-70 are products of Stepan Company.
[3]9.0 wt. % $BF_3$-MeOH complex in STEPANPOL ® PS-2402L.

TABLE 5

NVH Properties of PEEP Formulations for "Low-Temperature" NVH Applications at 1.0 Hz

| Ex. | $T_g$ by DSC (° C.) | Storage modulus, glass region, MPa | Tan delta, peak, at 1.0 Hz | Temp. at peak tan delta, ° C. | Temp. at onset of damping (tan delta ≥0.5 at 1.0 Hz), ° C. | Temp. range over which tan delta is ≥0.5 at 1.0 Hz, ° C. |
|---|---|---|---|---|---|---|
| 15 | −30.1 | 1639 | 1.47 | −4.0 | −16.0 | 50.5 |
| 16 | −28.8 | 2843 | 1.37 | −2.4 | −12.7 | 40.9 |
| 17 | −37.5 | 3614 | 1.33 | −8.3 | −22.8 | 36.6 |
| 18 | −46.9 | 1902 | 1.43 | −7.3 | −22.3 | 35.1 |
| 19 | −28.6 | 2884 | 0.97 | −6.5 | −16.2 | 20.4 |
| 20 | −46.9 | 1773 | 1.34 | −29.6 | −36.0 | 18.9 |
| 21 | −36.7 | 2712 | 1.90 | −14.7 | −25.2 | >100* |
| 22 | −35.3 | — | 1.98 | −11.9 | −25.8 | 93.7 |
| 23 | −36.5 | 2128 | 1.98 | −11.7 | −23.5 | >100* |
| 24 | −42.2 | 2383 | 2.14 | −20.8 | −31.7 | >100* |
| 25 | −39.9 | 1154 | 2.18 | −15.1 | −28.4 | >100* |
| 26 | −15.4 | 2430 | 1.92 | 10.1 | −4.0 | 38.6 |
| 27 | −40.8 | 2618 | 1.74 | −13.2 | −27.1 | 59.0 |

Properties determined by dynamic mechanical analysis (DMA) at 1.0 Hz except for $T_g$ (by differential scanning calorimetry).
*Value of tan delta is at least 0.5 well into the rubbery (elevated temperature) region of the test.

TABLE 7

NVH Properties of PEEP Formulations for "High-Temperature" NVH Applications at 1.0 Hz

| Ex. | $T_g$ by DSC (° C.) | Storage modulus, glass region, MPa | Tan delta, peak, at 1.0 Hz | Temp. at peak tan delta, ° C. | Temp. at onset of damping (tan delta ≥0.5 at 1.0 Hz), ° C. | Temp. range over which tan delta is ≥0.5 at 1.0 Hz, ° C. |
|---|---|---|---|---|---|---|
| 28 | 20.1 | 2681 | 1.76 | 32.7 | 24.2 | 27.9 |
| 29 | — | 2627 | 1.05 | 59.4 | 51.4 | 16.5 |
| 30 | 25.6 | 2603 | 1.20 | 45.2 | 37.1 | 17.3 |
| 31 | 0.3 | 3072 | 1.69 | 20.9 | — | — |
| 32 | 6.4 | 2679 | 0.99 | 29.4 | 21.4 | 16.9 |
| 33 | — | 2112 | 1.93 | 15.4 | 5.0 | 44.7 |
| 34 | — | 1931 | 1.54 | 37.1 | 29.2 | 18.8 |
| 35 | — | 1577 | 0.97 | 60.6 | 52.3 | 17.0 |
| 36 | 11.0 | 2623 | 1.99 | 28.5 | 19.3 | 36.2 |
| 37 | — | 2292 | 1.86 | 25.4 | 16.7 | 30.8 |
| 38 | 24.8 | 2339 | 1.67 | 38.2 | 30.3 | 21.3 |
| 39 | — | 2837 | 2.15 | 32.1 | 23.5 | 33.4 |
| 40 | −8.8 | 2321 | 1.43 | 15.3 | 2.7 | 32.4 |
| 41 | −3.9 | 2079 | 1.99 | 18.4 | 5.5 | 41.0 |

Properties determined by dynamic mechanical analysis (DMA) at 1.0 Hz except for $T_g$ (by differential scanning calorimetry).

TABLE 6

PEEP Formulations for "High-Temperature" NVH Applications

| Ex. | Epoxide[1] | Wt. % epoxide | Polyol[2] | Wt. % polyol | PEEP index | OH value (mg KOH/g) | Catalyst[3], wt. % |
|---|---|---|---|---|---|---|---|
| 28 | EPON ® 828 | 46.0 | PC-1028P-210/ IPA-DEG-MPD | 52.2 | 110 | 186 | 0.16 |
| 29 | EPON ® 828 | 70.5 | PS-2352 | 28.0 | 300 | 235 | 0.14 |
| 30 | EPON ® 828 | 61.4 | PS-2352 | 36.8 | 200 | 235 | 0.16 |
| 31 | EPON ® 828 | 44.3 | PS-2352 | 53.2 | 100 | 235 | 0.23 |
| 32 | EPON ® 828 | 59.5 | PC-1011P-210 | 39.1 | 200 | 210 | 0.13 |
| 33 | EPALLOY ® 5000 | 45.0 | PC-1028P-210 | 52.2 | 100 | 210 | 0.26 |
| 34 | EPON ® 828 | 50.5 | PC-1028P-210 | 47.1 | 140 | 210 | 0.23 |
| 35 | EPALLOY ® 8240 | 66.5 | PC-1028P-210 | 31.5 | 300 | 210 | 0.18 |
| 36 | EPON ® 828 | 46.3 | PS-2602 | 51.5 | 100 | 260 | 0.20 |
| 37 | EPON ® 828 | 42.2 | PC-1028P-210 | 53.4 | 100 | 210 | 0.40 |
| 38 | EPON ® 828 | 49.2 | PC-1028P-210/ IPA-DEG-MPD | 50.0 | 125 | 186 | 0.07 |
| 39 | EPON ® 828 | 42.4 | PS-2002 | 55.6 | 100 | 200 | 0.18 |
| 40 | EPON ® 828 | 41.2 | PC-107-210 | 57.0 | 100 | 210 | 0.16 |
| 41 | EPON ® 828 | 36.5 | PS-1752 | 61.9 | 100 | 175 | 0.15 |

[1]EPON ® 828 is a product of Hexion Specialty Chemicals. EPALLOY ® 5000 and EPALLOY ® 8240 are products of CVC Thermoset Specialties.
[2]STEPANPOL ® PC-1011P-210, STEPANPOL ® PC-1028P-210, STEPANPOL ® PC-107-210, STEPANPOL ® PS-2352, STEPANPOL ® PS-2602, STEPANPOL ® PS-2002, and STEPANPOL ® PS-1752 are products of Stepan Company. IPA-DEG-MPD is a developmental polyol.
[3]9.0 wt. % $BF_3$-MeOH complex in STEPANPOL ® PS-2402L.

We claim:

1. A method which comprises reducing noise, vibration, or harshness properties of an industrial or consumer product by incorporating therein an effective amount of a polyether- and polyester-epoxide polymer (PEEP) composition, wherein the PEEP composition comprises a one-component or two-component reaction product of:
   (a) a polyepoxide compound having an equivalent weight within the range of 115 to 250 g/eq.; and
   (b) a polyol composition comprising:
      (i) a polyester polyol having a hydroxyl value within the range of 28 to 400 mg KOH/g, an average hydroxyl functionality within the range of 1.5 to 4.0, and an acid number less than 5 mg KOH/g; and
      (ii) a polyether polyol having a hydroxyl value within the range of 28 to 800 mg KOH/g and an average hydroxyl functionality within the range of 1.8 to 8.0;
   wherein the ratio of epoxy equivalents of the polyepoxide compound to hydroxyl equivalents of the polyol composition is within the range of 0.5 to 4.0;
   wherein the PEEP composition has a glass-transition temperature as measured by differential scanning calorimetry within the range of −50° C. to 50° C.; and
   wherein the PEEP composition has a loss factor of at least 0.5 by ASTM D5992 over a temperature range of at least 15 Celsius degrees at one or more frequencies within the range of 0.1 to 10,000 Hz.

2. The method of claim 1 wherein the polyepoxide compound is an aromatic polyepoxide.

3. The method of claim 2 wherein the aromatic polyepoxide is a reaction product of a bisphenol and epichlorohydrin having an equivalent weight within the range of 185 to 200 g/eq.

4. The method of claim 1 wherein the polyepoxide compound is an aliphatic polyepoxide.

5. The method of claim 1 wherein the polyester polyol is one or more aromatic polyester polyols.

6. The method of claim 1 wherein the polyester polyol has a hydroxyl value within the range of 60 to 350 mg KOH/g and an average hydroxyl functionality within the range of 1.8 to 3.5.

7. The method of claim 1 wherein the polyether polyol has a hydroxyl value within the range of 150 to 550 mg KOH/g and an average hydroxyl functionality within the range of 3.5 to 8.0.

8. The method of claim 1 wherein the ratio of epoxy equivalents of the polyepoxide compound to hydroxyl equivalents of the polyol composition is within the range of 0.6 to 3.0.

9. The method of claim 1 wherein the ratio of epoxy equivalents of the polyepoxide compound to hydroxyl equivalents of the polyol composition is within the range of 0.8 to 2.0.

10. The method of claim 1 wherein the PEEP composition has a glass-transition temperature within the range of −40° C. to 40° C.

11. The method of claim 1 wherein the PEEP composition has a glass-transition temperature within the range of −30° C. to 30° C.

12. The method of claim 1 wherein PEEP composition is curable within seven days at temperatures within the range of 0° C. to 200° C.

13. The method of claim 1 wherein the PEEP composition has a loss factor of at least 0.6 by ASTM D5992 over a temperature range of at least 25 Celsius degrees measured at a frequency in the range of 0.1 to 10 Hz.

14. The method of claim 1 wherein the PEEP composition has a loss factor of at least 0.6 by ASTM D5992 over a temperature range of at least 50 Celsius degrees measured at a frequency in the range of 0.1 to 10 Hz.

15. The method of claim 1 wherein the PEEP composition has a loss factor of at least 1.0 by ASTM D5992 measured at a frequency in the range of 0.1 to 10 Hz.

16. The method of claim 1 wherein the loss factor applies at a temperature within the range of −50° C. to 200° C.

17. The method of claim 1 wherein the loss factor applies at a temperature within the range of −40° C. to 100° C.

18. The method of claim 1 wherein the PEEP composition has, as measured by ASTM D5992 at a frequency of 1 Hz, a loss factor of at least 1.0, a temperature at the onset of tan delta ≥0.5 less than 0° C., and a range over which tan delta is 0.5 of at least 15 Celsius degrees.

19. The method of claim 1 wherein the PEEP composition has, as measured by ASTM D5992 at a frequency of 1 Hz, a loss factor of at least 1.0, a temperature at the onset of tan delta ≥0.5 less than −15° C., and a range over which tan delta is 0.5 of at least 25 Celsius degrees.

20. The method of claim 1 wherein the PEEP composition is produced in the presence of a catalyst selected from the group consisting of boron trifluoride-based catalysts and aluminum triflate-based catalysts.

21. The method of claim 1 wherein the PEEP composition is formulated as a one-component, storage-stable, heat-activated system.

22. The method of claim 1 wherein the PEEP composition is formulated as a two-component system.

23. The method of claim 1 further comprising forming a construction or transportation adhesive comprising the PEEP composition for the industrial or consumer product.

24. The method of claim 1 wherein the industrial or consumer product is a motor vehicle, watercraft, aircraft, train, subway car, or snowmobile.

25. The method of claim 1 wherein the industrial or consumer product is a household appliance, HVAC unit, wind turbine, electronic device, power tool, lawnmower, leaf blower, snow blower, or sporting good.

* * * * *